United States Patent [19]

Dieffenbach

[11] Patent Number: 4,911,301

[45] Date of Patent: Mar. 27, 1990

[54] LAMINATED CASE FOR MAGNETIC DISK AND METHOD OF MANUFACTURING SAME

[75] Inventor: Harry N. Dieffenbach, Fremont, Calif.

[73] Assignee: dcTEQ, a California Limited Partnership, Fremont, Calif.

[21] Appl. No.: 298,297

[22] Filed: Jan. 17, 1989

Related U.S. Application Data

[63] Continuation of Ser. No. 132,635, Dec. 9, 1987, abandoned, which is a continuation-in-part of Ser. No. 910,214, Sep. 22, 1986, abandoned.

[51] Int. Cl.$^4$ ...................... B65D 85/30; B32B 31/00
[52] U.S. Cl. .................... 206/444; 156/73.1; 156/580.2

[56] References Cited

U.S. PATENT DOCUMENTS

| | | | |
|---|---|---|---|
| 3,440,118 | 4/1969 | Obeda | 156/580.2 |
| 3,668,658 | 6/1972 | Flores | 360/133 |
| 3,733,238 | 5/1973 | Long | 156/73.1 |
| 3,864,755 | 2/1975 | Hargis | 360/133 |
| 4,251,843 | 2/1981 | Masuyama | 360/137 |
| 4,277,810 | 7/1981 | Helmrich | 206/444 |
| 4,475,966 | 10/1984 | Turner | 156/73.1 |
| 4,479,579 | 10/1984 | Miklos | 206/444 |
| 4,525,758 | 6/1985 | Nakagawa | 206/444 |
| 4,648,002 | 3/1987 | Mroz | 360/137 |
| 4,699,268 | 10/1987 | Oishi | 206/444 |

FOREIGN PATENT DOCUMENTS

| | | | |
|---|---|---|---|
| 0187981 | 9/1985 | Japan | 206/444 |
| 1514914 | 6/1978 | United Kingdom | 156/73.1 |

OTHER PUBLICATIONS

"Application of Ultrasonics to Thermoplastic Materials," Mecasonic.
"Cartridge for Magnetic Disk"; IBM Technical Disclosure; F. K. King et al.; 12-76.

Primary Examiner—George F. Lesmes
Assistant Examiner—J. Davis
Attorney, Agent, or Firm—Thomas E. Schatzel

[57] ABSTRACT

A laminated case for a magnetic disk having a pair of outer laminae and a spacer lamina sandwiched therebetween. The spacer lamina adds rigidity to the laminated case and controls the height of a cavity in which the magnetic disk is located. A liner for wiping the disk is attached to each of the outer laminae. The liner has a free hanging section which provides the wiping action. The three laminae are ultrasonically welded together by a method which employs a fixture and an ultrasonic welding horn. The method permits the magnetic disk to be tested and discarded without sacrificing the laminated case.

4 Claims, 2 Drawing Sheets

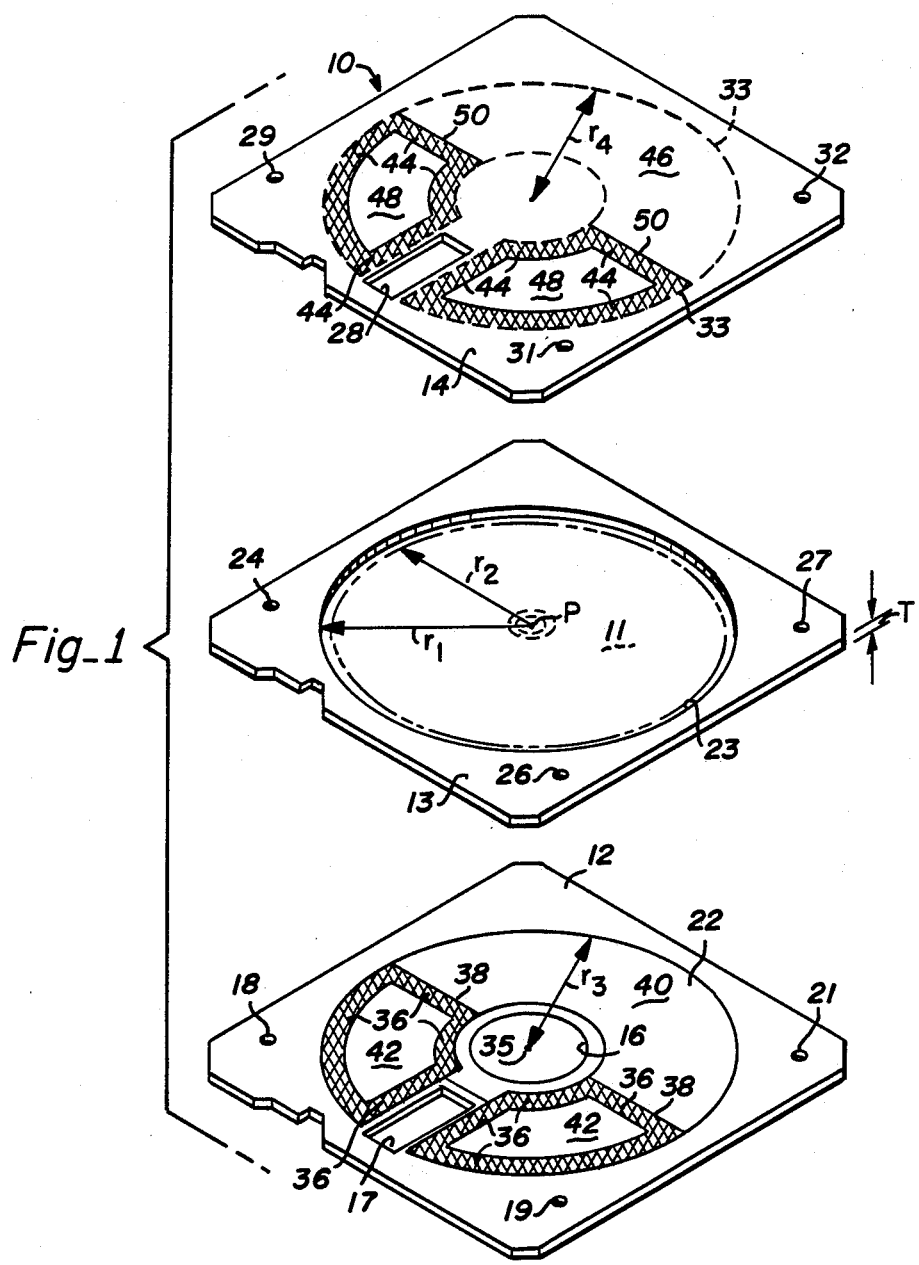
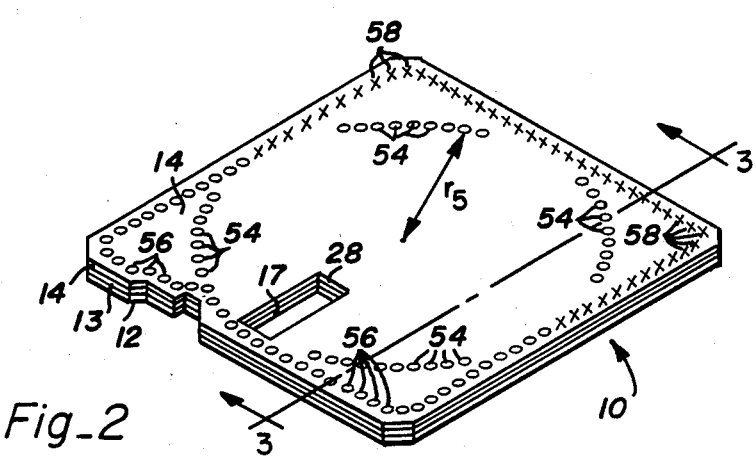

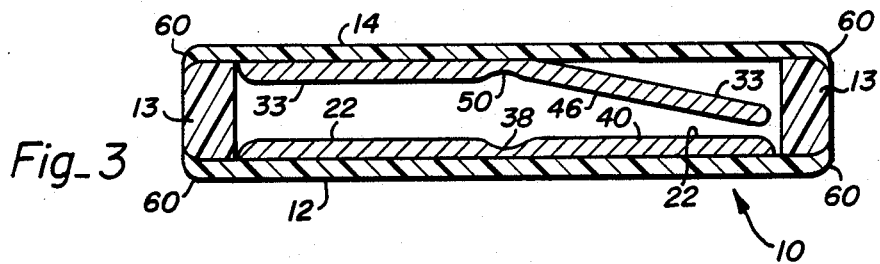
Fig_3
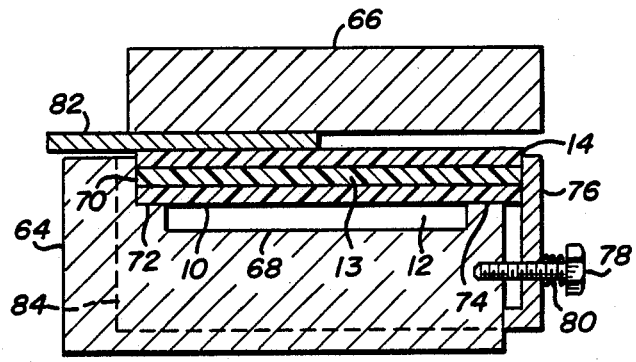
Fig_4
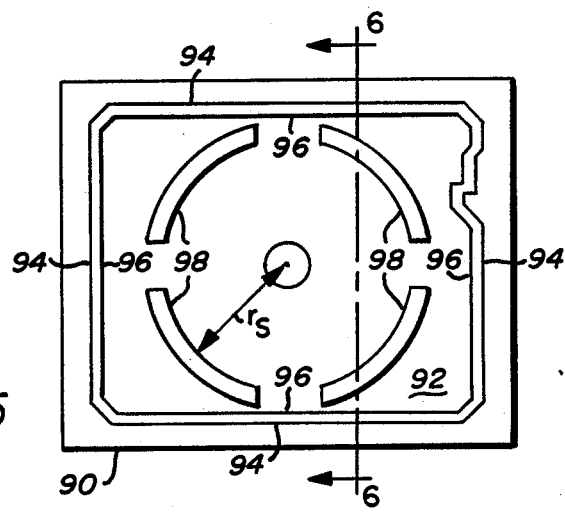
Fig_5
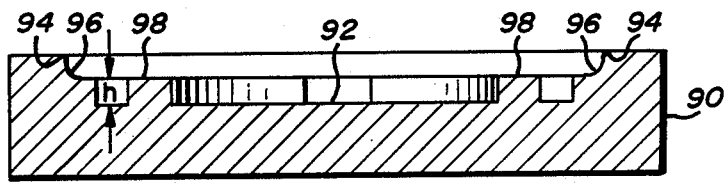
Fig_6
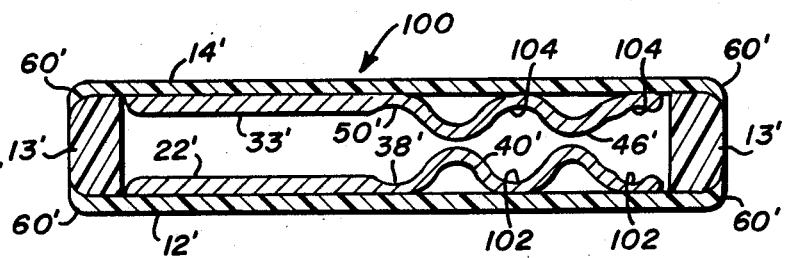
Fig_7

4,911,301

LAMINATED CASE FOR MAGNETIC DISK AND METHOD OF MANUFACTURING SAME

This is a continuation of co-pending application Ser. No. 07/132,635 filed on 12/09/87, which is in tern a contiuation-in-part of co-pending application Ser. No. 06/910,214 filed on 09/22/86, both now abandoned.

BACKGROUND OF THE INVENTION

1. Field of the Invention

This invention relates generally to information storage devices of the magnetic disk type and, more particularly, to a laminated case for housing a magnetic disk and to a method of manufacturing the same.

2. Description of the Prior Art

Magnetic disks have been encased within cartridges to prevent the magnetic surfaces of the disk from being soiled or damaged. These cartridges provide access for a spindle to drive the disk when loaded in a disk drive and for heads to contact the disk for recording or picking up data. Such cartridges have been made of two molded plastic halves that are bonded together. Each half includes a side panel and integral ribs projecting perpendicularly from the side panel. A rib extends about the perimeter of the side panel. Another rib defines a disk operating cavity, and various ribs extend between the perimetrical rib and the rib that defines the disk cavity.

Molding is a time consuming step in manufacturing cartridges. The mold must be opened and closed. The forming material must be plasticised and then removed in hardened form. Furthermore, molded cartridge halves present problems in decorating or providing information thereon. Some decorations, such as a trademark, can be included in the molds, but then the molds are limited to production for the trademark brand. It is difficult to decorate the side panels of a cartridge by passing them through a printing press or heat embossing thereon because the ribs do not provide uniform support for the side panels.

Another problem with the prior art is that the flexibility of the cartridges allows the cavity containing the magnetic disk to collapse thus pinching the disk. This is particularly troublesome in 3.5 inch microfloppy disks.

SUMMARY OF THE PRESENT INVENTION

An object of the present invention is to provide a method of manufacturing a magnetic disk case wherein all steps can be performed quickly and continuously.

Another object is to provide a magnetic disk case that is more rigid than conventional cartridges formed by two molded plastic halves.

Another object of the present invention is to provide a magnetic disk case having a deep disk cavity.

Another object of the present invention is to provide a magnetic disk case having liners which can provide disk wiping action despite the deep disk cavity.

A further object is to provide a laminated case that has been decorated by imprinting upon at least one of the outer lamina before the case is assembled.

A laminated case for a magnetic disk is formed by a spacer lamina, a first outer lamina on one side of the spacer lamina, and a second outer lamina on the opposite side of the spacer lamina. The first outer lamina has a spindle hole that extends perpendicularly therethrough. Each outer lamina has a head access slot that extends perpendicularly therethrough. The spacer lamina has a cavity that extends perpendicularly therethrough for receiving the magnetic disk in a common plane with the spacer lamina which has a thickness that defines the depth of the cavity. The laminae have similar perimetric configurations to provide uniform edges on the case, and the lamina are ultrasonically bonded together to form the case. A double thickness liner is ultrasonically bonded to each of the outer laminae. A section of the liner is free hanging so as to provide wiping action.

The magnetic disk case is manufactured by assembling the three laminae and subjecting them to a two-step ultrasonic bonding process. In the first step, a weld is made around approximately half of the disk case perimeter. This allows the magnetic disk to be inserted, tested and removed without sacrificing the disk case. In the second step, a full perimeter weld is made.

An advantage of the present invention is that the spacer lamina provides rigidity to the magnetic disk case.

Another advantage of the present invention is that the hanging liners enable wiping action to occur in the cavity formed by the spacer lamina.

Another advantage of the present invention is that laminae made from flat stock pieces can be welded together in a quick process.

Another advantage of the present invention is that the magnetic media can be rejected without sacrificing the disk case.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is an exploded perspective view of a laminated case of the present invention.

FIG. 2 is a perspective view of the assembled laminated case;

FIG. 3 is a cross-sectional view of the laminated case taken along the line 3—3 of FIG. 2;

FIG. 4 is a cross-sectional view of a device for making ultrasonic welds;

FIG. 5 is a top view of a fixture for making ultrasonic welds;

FIG. 6 is a cross-sectional view of the fixture taken along the line 6—6 of FIG. 5; and FIG. 7 is a cross-sectional view of an alternative embodiment of a laminated case of the present invention taken along the same section as shown in FIG. 3.

DESCRIPTION OF THE PREFERRED EMBODIMENTS

With reference to FIG. 1, a laminated case is indicated by general reference numeral 10 for housing a magnetic disk 11 that is shown in phantom line. The case is formed by an outer lamina 12, a spacer lamina 13 and an outer lamina 14. The outer lamina 12 has a spindle hole 16 and a head access slot 17 that extend perpendicularly through the lamina 12. The lamina 12 has a generally rectangular perimetric configuration with notches and indentations that conform to standards for magnetic disk cartridges. Near one corner of the lamina 12, an aligning hole 18 extends perpendicularly through the lamina 12. Similarly, aligning holes 19 and 21 extend perpendicularly through the lamina 12 near other corners thereof. A liner 22 is affixed to the lamina 12 adjacent the spacer lamina 13. The liner 22 is made of a material suitable for wiping dust and dirt from the magnetic disk 11.

The spacer lamina 13 has a perimetric configuration of generally rectangular shape similar to the outer lamina 12. A cavity 23 extends perpendicularly through the spacer lamina 13 for receiving the magnetic disk 11. Since the cavity 23 has a radius $r_1$ that is larger than the disk radius $r_2$, the disk 11 fits within the cavity 23 in a common plane with the spacer lamina 13. The radii $r_1$ and $r_2$ both originate at a point p which is located at the center of cavity 23. The spacer lamina 13 has a thickness T that defines the depth of the cavity 23. Aligning holes 24, 26 and 27 extend perpendicularly through the spacer lamina 13.

The outer lamina 14 has a head access slot 28 and aligning holes 29, 31 and 32 that extend perpendicularly through the lamina 14. A liner 33 is affixed to the lamina 14 on the surface adjacent the spacer cavity 23. Both the liner 33 and the liner 22 are made of material suitable for wiping dust and dirt from the magnetic disk 11 such as non-woven polyester or a rayon-polyester blend. The liners 33 and 22 have a thickness of approximately 0.012 to 0.016 inches. The lamina 14 has a perimetric configuration similar to the spacer lamina 13 and the lamina 12. All of the laminae are made from flat stock material. A suitable plastic such as polyvinyl chloride (PVC) could be used. A wood or paper pulp product such as pasteboard or more particularly a high density bristol board is also suitable, and such a paper pulp product has better insulating properties than plastic. The laminae 12, 13 and 14 are bonded together to form the case by bonding means such as ultrasonic welds in the case of plastic lamina or by a suitable adhesive for either plastic or a paper pulp product.

A point 35, which is a projection of point p, is located in the center of the spindle hole 16. The liner 22 is a circular piece of material having a radius $r_3$, originating at point 35, which is slightly less than radius $r_1$ of cavity 23, Thus, liner 22 fits within cavity 23. A circular piece and a rectangular piece are cut out of liner 22 so that liner 22 fits around the spindle hole 16 and the head access slot 17. The liner 22 is attached to the outer lamina 12 along a region 36 by ultrasonic welding. The region 36 extends along the interior and exterior edges of liner 22 and across a hinge area 38 such that liner 22 is divided into a section 40 and a pair of sections 42. Because of region 36, the sections 42 are attached to lamina 12 while section 40 is not.

The liner 33 is attached to lamina 14 such that liner 33 forms a mirror image of liner 22. The liner 33 has a radius $r_4$ which can be equal to $r_3$. Pieces are cut out of liner 33 so that liner 33 fits around the head access slot 28 and around the projection of spindle hole 16 onto lamina 14. The liner 33 is attached to the lamina 14 along a region 44 by ultrasonic welding such that the region 44 is the mirror image of the region 36. Thus, the liner 33 is divided into a section 46 and a pair of sections 48 and has a hinge area 50. The hinge areas 38 and 50 are sections of the regions 36 and 44 that cut perpendicularly across a face of the liners 22 and 33, respectively, and that bond the liners 22 and 33 to the laminae 12 and 14.

FIG. 2 shows an assembled laminated case 10. A pattern 54 is depicted on the outer surface of lamina 14 as a circle having a radius $r_5$ which is slightly greater than the radius $r_1$ shown in FIG. 1. The pattern 54 represents a region where ultrasonic welding occurs. A pattern 56, extending around approximately half the rectangular perimeter of lamina 14, on the same side as head access slot 28, also represents a region where ultrasonic welding occurs. A similar pattern 58 represents a region where ultrasonic welding occurs along the half rectangular perimeter of lamina 14 not covered by pattern 56. Mirror images of the patterns 54, 56 and 58 (not shown) exist on the outer surface of lamina 12. All of the exterior edges and corners of lamina 12 and 14 are rounded.

FIG. 3, which is a cross-section of the assembled laminated case 10 taken along the line 3—3 of FIG. 2, shows that the section 46 of liner 33 is free to hang from the hinge area 50. Similarly, if the case 10 were turned over, section 40 would be free to hang from hinge area 38.

A radius 60 is shown along the edges of the case 10. The radius 60 is a smooth curve which extends continuously around the perimeter of the case 10.

FIG. 4 shows a cross-sectional view of a tacking fixture 64 and an ultrasonic welding horn 66. The fixture 64 is comprised of a material such as hard anodized aluminum. A cavity 68 is cut into the fixture 64 to isolate the laminated case 10 from contact with the fixture 64 except along a wall 70, a step 72 and a support 74. A spring loaded element 76 is attached to a side of the fixture 64 so as to hold the laminated case firmly against the wall 70. A screw 78 extends perpendicularly through the element 76 and into the fixture 64. A spring 80 is positioned between the head of screw 78 and element 76. A spacer 82, which can be a piece of paper, is positioned between the case 10 and the horn 66 so that the spacer 82 covers approximately half of case 10 on the side of case 10 that is resting on the step 72. A second spring loaded element 84, shown by dashed lines, is attached to another side of the fixture 64.

FIG. 5 shows a finishing fixture 90 used in making the ultrasonic welding patterns 54, 56 and 58 and the radius 60. The fixture 90 can be comprised of the same material as the fixture 64. A cavity 92 is cut into the fixture 90. A boundry 94 of the cavity 92 has the same shape as the laminated case 10 and has dimensions such that the case 10 will register within the boundry 94. A step 96, having the same shape as the laminated case 10, but which abuts and is circumscribed by the boundry 94, provides a ledge which can support the case 10. A plurality of supports 98, arranged in a circle having a radius $r_5$ which is slightly larger than the radius $r_1$ of FIG. 1, extend upward from the floor of cavity 92.

FIG. 6 is a cross-sectional view of the fixture 90 taken along the line 6—6 of FIG. 5. Here it can be seen that the step 96 and the supports 98 have the same height "h". Also, it can be seen that the surface of the step 96 is curved.

FIG. 7 is a cross-sectional view of an alternative embodiment of the laminated case 10, designated by the general reference numeral 100, taken along the same section as shown in FIG. 3. Elements of laminated case 100 that are analogous to the elements of case 10 in FIG. 3, are designated by the same number followed by a prime designation. In the case 100 the sections 40' and 46' have at least one tacking area 102 and 104, respectively. The tacking areas 102 and 104 are regions where the sections 40' and 46' are affixed to the laminae 12' and 14', respectively, such that a pleated pattern exists in the sections 40' and 46'. The pleated pattern is a hanging section of the liners 22' and 33' that can improve the wiping action of the liners 22' and 33'.

The method of manufacturing the laminated case 10 begins by stamping flat stock material to form the spacer lamina 13 and the two outer laminae 12 and 14. Either simultaneously with the stamping or subsequently thereafter, the next step is punching holes perpendicularly through the laminae 12, 13 and 14. The cavity 23 is provided in the spacer lamina 13 for receiving the magnetic disk. The spindle hole 16 and the head access slot 17 are provided in the outer lamina 12, while the head access slot 28 is provided in the outer lamina 14. Also, aligning holes 18, 19 and 21 are provided in the lamina 12, aligning holes 24, 26 and 27 are provided in the spacer lamina 13, and aligning holes 29, 31 and 32 are provided in the lamina 14.

Since the laminae 12, 13 and 14 are made of flat stock material, at least one of the outer laminae 12 and 14 can be decorated by imprinting information and decorative material thereon. Such imprinting can be performed by passing the laminae through a printing press or by heat embossing a laminae made of plastic.

The liners 22 and 33 are affixed to the laminae 12 and 14, respectively, by ultrasonic welding along the patterns 36 and 44 in FIG. 1.

The laminated case 10 is then assembled by placing the spacer lamina 13 between the laminae 12 and 14 and roughly aligning the three laminae. The laminated case 10 is positioned on the tacking fixture 64 (shown in FIG. 4), with the head access slots 28 and 17 positioned adjacent to the spring loaded element 76. The element 76 functions to keep the case 10 tightly positioned against the wall 70 and the step 72 and support 74. Additionally, the screw 78 and spring 80 of element 76 allow the case 10 to expand in response to thermal forces created during the welding process.

The spacer 82 is positioned over the approximate half of case 10 which does not contain the head access slots 28 and 17 and a tacking weld is made by bringing the horn 66 into contact with the spacer 82. This process creates an ultrasonic weld along the pattern 58 shown in FIG. 2. Since the pattern 58 weld only covers half of the case 10, the laminae 12 and 14 can be pried open near the head access slots 17 and 28, allowing the magnetic media 11 to be inserted. The media 11 can then be tested by suitable electronic means, such as insertion in a functioning disk drive of a personal computer. If the media 11 is found to be defective, it can be removed from the case 10 and discarded. A new media 11 can be inserted in the old case 10 and the media testing process repeated. Thus, the case 10 does not have to be discarded during the manufacturing process when a defective media is encountered.

Once a satisfactory media has been detected in the case 10, case 10 is permanently sealed using the finishing fixture 90 of FIG. 5.

The case 10 is positioned in the fixture 90 With the lamina 14 lying in the cavity 92. The ultrasonic welding horn 66 (shown in Fig. 4) is brought into contact, under pressure, with the entire exposed surface of lamina 12 and a weld is made. This process produces ultrasonic welding along the patterns 54, 56 and 58 shown in FIG. 2 because the step 96 and the supports 98 function as energy focusing points in the ultrasonic welding process. The supports 98 produce a weld which bonds the lamina 14 to the spacer lamina 13 along the pattern 54. Similarly, the step 96 produces a weld which bonds the lamina 14 to the spacer lamina 13 along the patterns 56 and 58. Additionally, the curvature of the surface of step 96, shown in FIG. 6, strengthens the bond between the lamina 14 and spacer lamina 13 by allowing more intermixing of the molten plastic from laminae 13 and 14. This curvature produces the radius 60 shown in FIG. 3.

After the welded patterns 54, 56 and 58 are made, the case 10 is removed from the fixture 90, turned over and placed in a second finishing fixture which is the mirror image of fixture 90 and the welding process if repeated. This produces a series of welding patterns on the lamina 12 which are the mirror images of the patterns 54, 56 and 58 and which function to bond the lamina 12 to the spacer lamina 13. Alternatively, the mirror image welding patterns on lamina 12 can be produced by incorporating the mirror image of fixture 90 into the face of the welding horn used to produce the patterns 54, 56 and 58.

FIG. 3 shows that the sections 40 and 46 of the liners 22 and 33, respectively, are free to hang from the hinge areas 38 and 50 under the force of gravity. The thickness of the liners 22 and 33 is selected to lie in the range of approximately 0.012 to 0.016 inches so as to provide sufficient mass to achieve a firm wiping action on the disk 11 by the hanging liner 22 or 33.

The spacer lamina 13, shown in FIG. 1, serves two purposes. First, it imparts a structural rigidity to the case 10. This rigidity is enhanced by bonding the spacer lamina 13 to the lamina 14 along the pattern 54 (shown in FIG. 2). Second, the spacer lamina 13 provides a means for controlling the height of the cavity 23 by varying the thickness T of lamina 13. This is particularly important in disks for use with 3.5 inch micro-disk drives because there is a broad range of tolerances in the dimension between the micro-disk drive heads and the top of the drive spindle. The rigidity of the case 10 ensures that the height of cavity 23 will be maintained thus, reducing the possibility that the disk will be pinched.

While the laminated case 10 was designed specifically for housing 3.5 inch micro-disk, the size of laminae 12, 13 and 14 and cavity 23 can be varied to accommodate magnetic disks of various sizes. It has been mentioned that the laminae 12, 13 and 14 can be stamped from flat stock material such as plastic or a paper pulp product.

Another material that could be used would be a pulp product covered with a layer of plastic. The use of the pulp product would be inexpensive while the plastic layer would allow ultrasonic welding to be used.

From the foregoing description, it will be seen that the laminated case 10 can be manufactured by a rapid and continuous method that includes stamping and punching laminae 12, 13 and 14 from flat stock material instead of molding cartridge halves. Since the outer laminae 12 and 14 are formed from flat stock material, these laminae can be imprinted with information and decorative material by passing through a printing press or by heat embossing thereon. The laminated case is more rigid than conventional disk cartridges because the corners of the case extending outward from the disk cavity are formed by three solid laminae.

Although the present invention has been described in terms of the presently preferred embodiments, it is to be understood that such disclosure is not to be interpreted as limited. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A laminated case for a magnetic disk comprising:
   a first outer lamina having a spindle hole that extends perpendicularly through the lamina;
   a second outer lamina that is parallel with the first outer lamina, each of the first and second outer lamina having a head access slot that extends perpendicularly therethrough and the first and second laminae having similar perimetrical configurations to provide uniform edges on the case;
   a spacer lamina interposed between the first outer lamina and the second outer lamina, the spacer lamina having a cavity extending perpendicularly therethrough for receiving a magnetic disk in a common plane with the spacer lamina which has a thickness that defines the depth of the cavity;
   at least one ultrasonic bonding region for bonding the laminae together to form the case;
   a first liner having a thickness in the approximate range of 0.012 and 0.016 inches affixed to the first outer lamina along a first ultrasonic welding pattern, said first ultrasonic welding pattern functioning to bond a first section of the first liner to the first outer lamina with said first section being in a plane substantially co-planar to the first outer lamina and to provide a hinge area from which a second section of the first liner can hang at an angle relative to said plane, said second section of the first liner having a free end which is not bonded to the first outer lamina and the edge of the free end projects axially being capable of contacting a magnetic disk; and
   a second liner having a thickness in the approximate range of 0.012 to 0.016 inches affixed to the second outer lamina along a second ultrasonic welding pattern, said second ultrasonic welding pattern functioning to bond a first section of the second liner to the second outer lamina and to provide a hinge area from which a second section of the second liner can hang, and said second section of the second liner having a free end which is not bonded to the second outer lamina.

2. The laminated case of claim 1 wherein, the first and second outer laminae and the spacer lamina are made of plastic material.

3. A laminated case for a magnetic disk comprising:
   a first outer lamina having a spindle hole that extends perpendicularly through the lamina;
   a second outer lamina that is parallel with the first outer lamina, each of the first and second outer lamina having a head access slot that extends perpendicularly therethrough and the first and second laminae having similar perimetrical configurations to provide uniform edges on the case;
   a spacer lamina interposed between the first outer lamina and the second outer lamina, the spacer lamina having a cavity extending perpendicularly therethrough for receiving a magnetic disk in a common plane with the spacer lamina which has a thickness that defines the depth of the cavity;
   at least one ultrasonic bonding region for bonding the laminae together to form the case;
   a first liner affixed to the first outer lamina along a first ultrasonic welding pattern, said first ultrasonic welding pattern functioning to bond a first section of the first liner to the first outer lamina with said first section being in a plane substantially co-planar to the first outer lamina and to provide a hinge area from which a second section of the first liner can hang at an angle relative to said plane, said second section of the first liner having a free end which is not bonded to the first outer lamina and the edge of the free end projects axially being capable of contacting a magnetic disk; and
   a second liner affixed to the second outer lamina.

4. The laminated case of claim 3 wherein, the second liner is affixed to the second outer lamina along a second ultrasonic welding pattern, said second ultrasonic welding pattern functioning to bond a first section of the second liner to the second outer lamina with said first section of the second liner being in a plane substantially co-planar to the second outer lamina and to provide a hinge area from which a second section of the second liner can hang at an angle relative to said plane of said second outer lamina, and said second section of the second liner having a free end which is not bonded to the second outer lamina and the edge of the free end projects axially being capable of contacting said magnetic disk.

* * * * *